United States Patent
Lüchinger et al.

(10) Patent No.: US 12,092,845 B2
(45) Date of Patent: Sep. 17, 2024

(54) COLOR CONVERSION FILM COMPRISING INORGANIC SEPARATION LAYER

(71) Applicant: Avantama AG, Stäfa (CH)

(72) Inventors: Norman Albert Lüchinger, Meilen (CH); Deniss Sabani, Greifensee (CH); Fangjian Lin, Zürich (CH); Sacha Bissig, Bürglen (CH)

(73) Assignee: Avantama AG, Stäfa (CH)

( * ) Notice: Subject to any disclaimer, the term of this patent is extended or adjusted under 35 U.S.C. 154(b) by 0 days.

(21) Appl. No.: 18/295,303

(22) Filed: Apr. 4, 2023

(65) Prior Publication Data
US 2023/0408742 A1 Dec. 21, 2023

(30) Foreign Application Priority Data

Jun. 15, 2022 (EP) .................................. 22179215

(51) Int. Cl.
| | |
|---|---|
| G02F 1/1335 | (2006.01) |
| C09K 11/02 | (2006.01) |
| C09K 11/06 | (2006.01) |
| C09K 11/08 | (2006.01) |
| G02B 1/04 | (2006.01) |
| G02B 1/14 | (2015.01) |
| G02B 5/20 | (2006.01) |

(52) U.S. Cl.
CPC .............. *G02B 5/206* (2013.01); *C09K 11/02* (2013.01); *C09K 11/06* (2013.01); *C09K 11/0883* (2013.01); *G02B 1/04* (2013.01); *G02B 1/14* (2015.01); *G02B 2207/101* (2013.01); *G02F 1/133514* (2013.01)

(58) Field of Classification Search
CPC . G02B 5/206; G02B 1/00; G02B 1/14; G02B 2207/101; C09K 11/02; C09K 11/06; C09K 11/0883; C09K 11/025; C09K 11/665; C09K 11/883; C09K 11/66; G02F 1/133514; G02F 1/1335; H01L 33/502; H01L 33/505; H01L 33/507; H10K 50/115; H10K 50/86
See application file for complete search history.

(56) References Cited

U.S. PATENT DOCUMENTS

| | | | | |
|---|---|---|---|---|
| 9,685,585 | B2 * | 6/2017 | Gupta | H01L 33/06 |
| 11,254,864 | B2 * | 2/2022 | Doherty | C09D 11/037 |
| 2016/0359300 | A1 * | 12/2016 | El-Ghoroury | H01L 33/06 |
| 2016/0372638 | A1 * | 12/2016 | Todorov | C09K 11/77348 |
| 2017/0186922 | A1 * | 6/2017 | Kim | C09K 11/88 |
| 2019/0145587 | A1 * | 5/2019 | Dursun | H05B 33/14 |
| | | | | 250/458.1 |
| 2019/0148602 | A1 * | 5/2019 | Mu | C09K 11/665 |
| | | | | 362/362 |
| 2019/0148605 | A1 * | 5/2019 | Mu | H01L 33/50 |
| | | | | 257/98 |
| 2019/0348575 | A1 * | 11/2019 | Lai | H01L 33/502 |
| 2020/0081292 | A1 * | 3/2020 | Park | H05B 33/10 |
| 2020/0126955 | A1 * | 4/2020 | Chen | H01L 33/58 |
| 2021/0130686 | A1 * | 5/2021 | Lim | C01G 9/08 |
| 2021/0332292 | A1 * | 10/2021 | Hu | C09K 11/665 |
| 2021/0367113 | A1 * | 11/2021 | Lin | H01L 33/504 |
| 2022/0064524 | A1 * | 3/2022 | Sinatra | C08K 5/50 |
| 2022/0069174 | A1 * | 3/2022 | Luo | H01L 33/005 |
| 2022/0102660 | A1 * | 3/2022 | Lee | H10K 50/115 |
| 2022/0194969 | A1 * | 6/2022 | Lee | C09K 11/02 |
| 2023/0109233 | A1 * | 4/2023 | Onuma | G09G 3/32 |
| | | | | 257/89 |
| 2023/0111894 | A1 * | 4/2023 | Park | C09K 11/665 |
| | | | | 257/40 |
| 2023/0161094 | A1 * | 5/2023 | Zhou | G02B 5/206 |
| | | | | 359/896 |

FOREIGN PATENT DOCUMENTS

WO 2021081380 A1 4/2021

OTHER PUBLICATIONS

Extended European Search Report for corresponding Application No. EP 22 17 9215, issued Nov. 3, 2022.
Yun-Hyuk Ko et al.; Environmentally friendly quantum-dot color filters for ultra-high-definition liquid crystal displays; Scientific Reports; 2020; natureresearch.

* cited by examiner

*Primary Examiner* — Balram T Parbadia
(74) *Attorney, Agent, or Firm* — Renner, Otto, Boisselle & Sklar, LLP

(57) ABSTRACT

A color conversion film is provided which, upon excitation by blue light, emits green and red light. The color conversion films include at least one red light emitting layer, one green light emitting layer and sandwiched in between at least one inorganic separation layer. The green light emitting layer includes green emitting perovskite crystals.

20 Claims, No Drawings

COLOR CONVERSION FILM COMPRISING INORGANIC SEPARATION LAYER

This application is a Secondary Application and claims priority to European Patent Application No. 22179215.3, filed Jun. 15, 2022, which is hereby incorporated herein by reference in its entirety.

TECHNICAL FIELD

The invention relates to a color conversion film comprising a layer of green perovskite crystals and a layer of red core-shell quantum dots and specific separation layers to thereby separate these layers. The invention further provides for methods to manufacture such films as well as devices comprising such films.

BACKGROUND ART

State-of-the-art liquid crystal displays (LCD) or display components comprise luminescent crystal (quantum dot) based components. In particular, a backlight component of such a LCD might comprise a RGB backlight consisting of a red, a blue and a green light. Today, typically luminescent crystals (quantum dots) are used to produce the backlight colours of such a backlight component.

The manufacturing of such components faces various challenges. One challenge is the embedding of the luminescent crystals into the component. Due to the different chemical properties of the luminescent crystals, there might be incompatibilities between the various embedded materials comprising the luminescent crystals or even between luminescent crystals embedded within the same material. Such incompatibilities might lead to degradation of the materials in the display components and therefore the lifetime of such a display might be affected.

In addition, luminescent crystal based components often deal with challenges regarding degradation by humidity and or oxygen. Luminescent perovskite crystals predominantly degrade by the presence of humidity/water and luminescent core-shell quantum dots predominantly degrade the presence of oxygen. It is difficult to achieve display components comprising green luminescent perovskite crystals and red luminescent core-shell quantum dots with sufficient stability against both humidity and oxygen.

Disclosure of the Invention

The problem to be solved by the present invention is to overcome the disadvantages of the prior art. In particular, the present invention overcomes the disadvantages of the prior art in terms of stability.

Unless otherwise stated, the following definitions shall apply in this specification:

The terms "a", "an" "the" and similar terms used in the context of the present invention are to be construed to cover both the singular and plural unless otherwise indicated herein or clearly contradicted by the context. The term "containing" shall include all, "comprising", "essentially consisting of" and "consisting of". Percentages are given as weight-%, unless otherwise indicated herein or clearly contradicted by the context. "Independently" means that one substituent/ion may be selected from one of the named substituents/ions or may be a combination of more than one of the above.

The term "luminescent crystal" (LC) is known in the field and in the context of the present invention relates to crystals of 2-100 nm, made of semiconductor materials. The term comprises quantum dots, typically in the range of 2 10 nm and nanocrystals, typically in the range of 10-100 nm.

LCs show, as the term indicates, luminescence. In the context of the present invention the term luminescent crystal includes both, single crystals and polycrystalline particles. In the latter case, one particle may be composed of several crystal domains (grains), connected by crystalline or amorphous phase boundaries. A luminescent crystal is a semi-conducting material which exhibits a direct bandgap (typically in the range 1.1-3.8 eV, more typically 1.4-3.5 eV, even more typically 1.7-3.2 eV). Upon illumination with electromagnetic radiation equal or higher than the bandgap, the valence band electron is excited to the conduction band leaving an electron hole in the valence band. The formed exciton (electron-electron hole pair) then radiatively recombines in the form of photoluminescence, with maximum intensity centered around the LC bandgap value and exhibiting photoluminescence quantum yield of at least 1%. In contact with external electron and electron hole sources LC could exhibit electroluminescence.

The term "quantum dot" (QD) is known and particularly relates to semiconductor nanocrystals, which have a diameter typically between 2-10 nm. In this range, the physical radius of the QD is smaller than the bulk ex-citation Bohr radius, causing quantum confinement effect to predominate. As a result, the electronic states of the QD, and therefore the bandgap, are a function of the QD composition and physical size, i.e. the color of absorption/emission is linked with the QD size. The optical quality of the QDs sample is directly linked with their homogeneity (more monodisperse QDs will have smaller FWHM of the emission). When QD reach size bigger than the Bohr radius the quantum confinement effect is hindered and the sample may not be luminescent anymore as nonradiative pathways for exciton recombination may become dominant. Thus, QDs are a specific subgroup of nanocrystals, defined in particular by its size and size distribution. Typical quantum dot compositions comprise Cadmium or Indium, for example in the form of Cadmium Selenide (CdSe) Indium Phosphide (InP).

The term "core-shell quantum dots" is known and particularly relates to quantum dots typically containing an Indium comprising or Cadmium comprising core, typically having a CdSe core or InP core having an additional shell typically comprising Zinc Sulfide (ZnS), Zinc Selenide (ZnSe), Cadmium Sulfide (CdS) or combinations thereof. Core-shell quantum dots may comprise multiple shells or shell gradients.

The term "perovskite crystals" is known and particularly includes crystalline compounds of the perovskite structure. Such perovskite structures are known per se and described as cubic, pseudocubic, tetragonal or or-thorhombic crystals of general formula $M^1M^2X_3$, where $M^1$ are cations of coordination number 12 (cuboctaeder) and $M^2$ are cations of coordination number 6 (octaeder) and X are anions in cubic, pseudocubic, tetragonal or orthorhombic positions of the lattice. In these structures, selected cations or anions may be replaced by other ions (stochastic or regularly up to 30 atom-%), thereby resulting in doped perovskites or nonstochiometric perovskites, still maintaining its original crystalline structure. Preferably, luminescent perovskite crystals are approximately isometric (such as spherical or cubic). Particles are considered approximately isometric, in case the aspect ratio (longest: shortest direction) of all 3 orthogonal dimensions is 1-2. Accordingly, an assembly of LCs preferably contains 50-100% (n/n), preferably 66-100% (n/n) much preferably 75-100% (n/n) isometric nanocrystals. The manufacturing of such luminescent perovskite crystals is known, e.g. from WO2018/028869.

The term "polymer" is known and includes organic and inorganic synthetic materials comprising repeating units ("monomers"). The term polymers includes homo-polymers and co-polymers. Further, cross-linked polymers and non-crosslinked polymers are included. Depending on the context, the term polymer shall include its monomers and oligomers. Polymers include, by way of example, acrylate polymers, carbonate polymers, sulfone polymers, epoxy polymers, vinyl polymers, urethane polymers, imide polymers, ester polymers, furane polymers, melamine polymers, styrene polymers, norbornene polymers, silazane polymers, silicone polymers and cyclic olefin copolymers. Polymers may include, as conventional in the field, other materials such as polymerization initiators, stabilizers, and fillers.

A first aspect of the invention refers to a color conversion film which, upon excitation by blue light, emits green and red light. Inventive films comprise a multitude of layers, whereby one layer is a green light emitting polymer layer comprising green emitting perovskite crystals; and one layer is a red light emitting polymer layer comprising red emitting core-shell quantum dots comprising Indium or Cadmium; and whereby the red and green light emitting polymer layer is separated by one or more separating layers. Suitable separating layers consists of inorganic material and cover the whole area of the red and/or the green light emitting polymer layer. Further, the color conversion film may comprise one or more protection layers attached to the red light emitting polymer layer and/or to the green light red emitting polymer layer. Further, the color conversion film may comprise one or more non-emissive polymer layers.

This aspect of the invention shall be explained in further detail below.

Color Conversion Film

Color conversion films are known per se and find wide application in commercial items such as displays. According to this invention, such films partially or fully convert blue light into red and green light. Typically, the blue light is converted partially, resulting in emission of light in the blue, the green and the read spectrum. Upon adjusting intensity of blue light, and concentration, film thickness and amount of luminescent green and red material, the color of the emitted light may be adjusted in line with customer's needs.

Such color conversion films may be described as laminated structure and identified by its individual layers, such as "red light emitting polymer layer", "green light emitting polymer layer", "separating layer", and "protecting layer" and optionally "non-emissive polymer layer".

Color conversion films typically have a film thickness, including all individual layers, of 10-500 micrometers, preferably 20-250 micrometers, most preferably 30-200 micrometers.

Color conversion films of this invention may be assembled to obtain a display backlight component. Accordingly, the invention also provides for a display backlight component comprising a color conversion film as described herein.

Color conversion films of this invention may be assembled to obtain a light emitting device, such as a liquid crystal display. Accordingly, the invention also provides for a light emitting device, preferably a Liquid crystal display, comprising a color conversion film as described herein.

Separating Layer:

Separating layers are often implemented in laminated structures and color conversion films. As the name implies, their function is to spatially separate two layers.

According to this invention, the separating layer essentially consists of, or consists of, inorganic material. Suitable inorganic materials may be selected from the group consisting of metal oxides, metal nitrides, silicon oxides and silicon nitrides. Suitable inorganic materials include, without limitation, $SiO_x$ (x=1.7-2.3), $AlO_x$ (x=1.3-1.7), and $Si_xN_y$ (x=3 and y=3.5-4.5).

In the context of this invention, a separating layer fully, or essentially fully, covers one surface of a first light emitting polymer layer. It is known in the field that film production that sections on the border of a laminated structure are not coated with functional layers to thereby allow or facilitate production ("spare area"). Even if such non-coated areas are present, the skilled person will understand that the laminated structure (i.e. the color conversion film) is fully covered by a separating layer except for spare area. Such spare area is typically below 5% of the total area of a laminated structure In the context of this invention, a separating layer is arranged between a first and a second light emitting layer. Separating layer and light emitting layer may be in direct contact or may be spaced apart by one or more non-emissive polymer layers.

In the context of this invention, a separating layer is a continuous layer. As the term continuous implies, the layer is non-porous and free of defects. Typically, the thickness of such layer is between 1 nm to 10 micrometers, preferably 10 nm to 1 micrometer. Typically, the thickness of such layer is above 10 nanometers. Such layers, when consisting of the material described herein, show gas barrier properties, particularly towards oxygen and water vapour.

In an advantageous embodiment, the separating layer provides properties of a humidity barrier. In embodiments, the separating layer has a water vapor transmission rate (WVTR) of less than 10 g/m2*day, preferably less than 1 g/m2*day, most preferably less than 0.1 g/m2*day. WVTR may be determined by ISO 15106-3:2003 at a temperature/relative humidity of 40° C./90% r.h.

In an advantageous embodiment, the separating layer provides properties of an oxygen barrier. In embodiments, the oxygen transmission rate (OTR) is less than 10 cm3/m2*day, preferably less than 1 cm3/m2*day, most preferably less than 0.1 cm3/m2*day. OTR determined by ISO15105 at a temperature of 23° C./90% r.h. and atmospheric pressure.

It was found that optical properties are not negatively influenced by including one or more of the separating layers as discussed herein. Rather, film stability is improved and beneficial optical properties are retained.

Protection Layer:

Protection layers are often implemented in laminated structures and in color conversion films. As the name implies, their function is to protect more sensitive layers of the laminated structure. As such, a protection layer is located outside the light emitting layers, e.g. as a top and/or as a bottom layer. Except for its location in the laminated structure, chemical composition and other characteristics are as described above for separating layers. Consequently, protection layers are essentially consists of, or consists of, inorganic material. In the context of this invention, a separating layer is a continuous layer. As the term continuous implies, the layer is non-porous and free of defects. Typically the thickness of such layer is 1 nm-10 micrometers, preferably 10 nm-1 micrometer. Such layers, when consisting of the material described herein, show gas barrier properties, particularly towards oxygen and water vapour. Further, such protective layers improve mechanical integrity of the inventive laminated structures and color conversion films. It was found that optical properties are not negatively influenced, by including one or more protection layers. Rather, mechanical stability is improved and optical properties are retained.

In an advantageous embodiment, a color conversion film as described herein is provided, comprising one or more first protection layers attached to the red light emitting polymer layer opposite to the separating layer; and one or more second protection layers attached to the green light emitting polymer layer opposite to the separating layer, whereby each protection layers independently consists of inorganic material; and is a continuous layer and preferably has a thickness of 1 nm to 10 micrometers; and covers the whole area of the color conversion film.

Non-Emissive Polymer Layer:

Such layers are known in the field and may be included in the color conversion film to improve compatibility, or to improve adhesion, or to facilitate manufacturing. PET films or acrylate films are typical examples for non-emissive polymer layers.

Green Light Emitting Polymer Layer:

The green luminescent crystals are perovskite crystals selected from compounds of formula (I):

$$[M^1A^1]_a M^2{}_b X_c \quad (I),$$

wherein:
A$^1$ represents one or more organic cations, in particular formamidinium (FA),
M$^1$ represents one or more alkaline metals, in particular Cs,
M$^2$ represents one or more metals other than M$^1$, in particular Pb,
X represents one or more anions selected from the group consisting of halides, pseudohalides and sulfides, in particular Br,
a represents 1-4,
b represents 1-2,
c represents 3-9, and
wherein either M$^1$, or A$^1$, or M$^1$ and A$^1$ being present.

In a further advantageous embodiment of the invention the green luminescent crystals are green luminescent perovskite crystals of formula (I'):

$$FAPbBr_3 \quad (I').$$

In particular, formula (I) describes perovskite luminescent crystals, which, upon absorption of blue light, emit light of a wavelength in the green light spectrum between 500 nm and 550 nm, in particular centered around 525-535 nm nm.

Suitable polymers may be selected from the group of acrylates and methacrylates.

Red Light Emitting Polymer Layer:

Red core-shell quantum dots are known, such quantum dots emit red light (630 nm+/−30 nm) in response to excitation by light of a shorter wavelength. Suitable crystals are selected from the group of II-VI semiconductor compounds and from the group of III-V semiconductor compounds.

In preferred embodiments, preferred red emitting core-shell quantum dots are having a core comprising Indium or Cadmium, most preferably Indium.

In another preferred embodiment, red emitting core-shell quantum dots are having a core comprising Indium phosphide or Cadmium selenide, most preferably Indium phosphide.

Suitable polymers may be selected from the group of acrylates and methacrylates.

The crystal size of the red core-shell quantum dots may vary over a broad range, but typically within 1-10 nm. Such crystals are referred as Quantum dots, thereby distinguishing from microcrystals. For II-VI semiconductor compounds, suitable ranges are 1-10 nm, preferably 3-8 nm. For III-V semiconductor compounds, suitable ranges are 1-8 nm, preferably 2-4 nm.

Advantageous Embodiments

Preferably, the luminescent crystals (perovskites and core-shell QDs) show a monodisperse size distribution. In the context of this invention, the term "monodisperse" refers to a population of quantum dots wherein at least about 60% of the population, preferably 75% to 90% of the population, or any integer or noninteger there between, falls within a specified particle size range. A population of monodispersed particles deviates less than 20% root-mean-square (rms) in diameter, more preferably less than 10% rms, and most preferably, less than 5% rms. Particle size and particle size distribution may be determined by microscopy.

In a further advantageous embodiment of the invention, the concentration of M$^2$ in the green emitting polymer layer is 100-1000 ppm preferably 300-1000 ppm, most preferably 500-1000 ppm and/or the concentration of M$^3$+M$^{3'}$ in the red emitting polymer layer is >300 ppm, preferably >600 ppm, most preferably >1'200 ppm and/or the red core-shell quantum dots have a platelet structure.

In a further advantageous embodiment of the invention, the red core-shell quantum dots have a particular size s p of 1 nm≤s$_p$≤10 nm, in particular 3 mn≤s$_p$≤8 nm, in particular 2 nm≤s$_p$≤6 nm, in particular 2 nm≤s$_p$≤4 nm.

In another advantageous embodiment, the green emitting polymer has a molar ratio of the sum of (oxygen+nitrogen+sulfur+phosphorous) to carbon z, wherein z≤0.9, z≤ in particular z≤0.4, in particular z 0.3, in particular z≤0.25. The z value is an indicator for polarity of a polymer. Values of z≤0.3 indicate nonpolar polymers. It was found that the polymer polarity influences film performance and a lower polarity for the polymer of the green light emitting film improves performance. Preferably, the z value of the polymer in the green light emitting layer z$_{green}$ is below the z value of the polymer in the red light emitting layer z$_{red}$. Preferably, z$_{green}$:z$_{red}$<1:2; more preferably z$_{green}$: z$_{red}$<1:5.

In another advantageous embodiment, the green and/or red emitting polymer comprises acrylate, very particular wherein the polymer comprises a cyclic aliphatic or cyclic aromatic acrylate.

In an advantageous embodiment the solid polymer comprises an acrylate selected from the list of isobornylacrylate (CAS 5888-33-5), isobornylmethacrylate (CAS 7534-94-3), dicyclopentanyl-acrylate (CAS 79637-74-4, FA-513AS (Hitachi Chemical, Japan)), dicyclopentanyl-methacrylate (CAS 34759-34-7, FA-513M (Hitachi Chemical, Japan)), 3,3,5-trimethyl cyclohexyl acrylate (CAS 86178-38-3), 3,3, 5-trimethyl cyclohexyl methacrylate(CAS 7779-31-9), 4-tert-butylcyclohexyl acrylate (CAS 84100-23-2), 4-tert-Butylcyclohexyl methacrylate (CAS 46729-07-1).

In another advantageous embodiment, the polymer of the green and/or red light emitting polymer layer is crosslinked.

In another advantageous embodiment, the polymer of the green and/or red emitting polymer layer comprises a multifunctional acrylate.

The inventive films may be manufactured using commercially available starting materials and laminating steps known to the skilled person. The examples provided below illustrate such manufacturing.

Architecture:

The inventive films may be implemented in a number of different architectures.

In a first embodiment, inventive films comprise in addition to the red and green light emitting polymer layers, one first inorganic protection layer, one second inorganic protection layer and one inorganic separating layer. It is understood that one or more additional layers, such as adhesive layers or other non-emissive polymer layers, may be present.

In a second embodiment, inventive films comprise in addition to the red and green light emitting polymer layers one first inorganic protection layer, one second inorganic protection layer and two inorganic separating layers between the light emitting layers. Again, it is understood that one or more additional layers, such as adhesive layers or other non-emissive polymer layers, may be present.

In a third embodiment, inventive films comprise a multitude of layers whereby between one or more inorganic layers and green and red light emitting polymer layers there is a non-emissive polymer layer. In this embodiment, a direct contact of light emitting polymer layer and inorganic separation/protection layer is avoided by introducing one or more non-emissive polymer layer(s).

In a further embodiment, inventive films comprise the following layer sequence: Inorganic protection layer/green emitting polymer layer/inorganic separating layer/red emitting polymer layer/inorganic protection layer.

In a further embodiment, inventive films comprise the following layer sequence: Inorganic protection layer/one or more non-emitting polymer layers/green emitting polymer layer/one or more non-emitting polymer layers/inorganic separating layer/red emitting polymer layer/inorganic protection layer; or In a further embodiment, inventive films comprise the following layer sequence: Inorganic protection layer/one or more non-emitting polymer layers/green emitting polymer layer/one or more non-emitting polymer layers/inorganic separating layer/non-emitting polymer layer/red emitting polymer layer/non-emitting polymer layer/inorganic protection layer.

EXAMPLES

Example 1: Preparation of a color conversion film according to the present invention with an inorganic barrier layer (inorganic separating layer) between the green emitting polymer layer and the red emitting polymer layer.

Formation of green ink: Green perovskite luminescent crystals with composition formamidinium lead tribromide ($FAPbBr_3$) are synthesized in toluene as following: Formamidinium lead tribromide ($FAPbBr_3$) was synthesized by milling $PbBr_2$ and FABr. Namely, 16 mmol $PbBr_2$ (5.87 g, 98% ABCR, Karlsruhe (DE)) and 16 mmol FABr (2.00 g, Greatcell Solar Materials, Queanbeyan, (AU)) were milled with Yttrium stabilized zirconia beads (5 mm diameter) for 6 h to obtain pure cubic $FAPbBr_3$, confirmed by XRD. The orange $FAPbBr_3$ powder was added to Oleylamine (80-90, Acros Organics, Geel (BE)) (weight ratio $FAPbBr_3$:Oleylamine=100:15) and toluene (>99.5%, puriss, Sigma Aldrich). The final concentration of $FAPbBr_3$ was 1 wt %. The mixture was then dispersed by ball milling using yttrium stabilized zirconia beads with a diameter size of 200 µm at ambient conditions (if not otherwise defined, the atmospheric conditions for all experiments are: 35° C., 1 atm, in air) for a period of 1 h yielding an ink with green luminescence.

Formation of green emitting polymer layer: 0.1 g of the green ink was mixed with an UV curable monomer/cross-linker mixture (0.7 g FA-513AS, Hitachi Chemical, Japan/0.3 g Miramer M240, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) in a speed mixer and the toluene was evaporated by vacuum (<0.01 mbar) at room temperature. The resulting mixture was then coated with 50 micron layer thickness on a 25 micron barrier film (supplier: I-components (Korea); SiOx layer on PET substrate) on the side of the inorganic layer, then laminated with a second barrier film of the same type whereby the side of the inorganic layer was adjacent the green emitting polymer layer. Afterwards the laminate structure was UVcured for 60 s (UVAcube100 equipped with a mercury lamp and quartz filter, Hoenle, Germany). The initial performance of the as obtained film showed a green emission wavelength of 526 nm with a FWHM of 22 nm.

Formation of red emitting polymer layer: 0.1 g red luminescent crystals being isometric core-shell QDs having an InP core and a ZnS shell (1 wt % suspended in toluene) were mixed with an UV curable monomer/crosslinker mixture (0.5 g FA-DCPA, Hitachi Chemical, Japan/0.5 g Miramer M2372, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) in a speed mixer and the toluene was evaporated by vacuum (<0.01 mbar) at room temperature. The resulting mixture was then coated with 50 micron layer thickness on the PET side of a barrier film on the green emitting film, then laminated with a barrier film of the same type as used before whereby the side of the inorganic layer was adjacent the red emitting polymer layer. Afterwards the laminate structure was UV-cured for 60 s (UVAcube100 equipped with a mercury lamp and quartz filter, Hoenle, Germany). The initial performance of the as obtained film showed a red emission wavelength of 630 nm with a FWHM of 45 nm.

The stability of the film was tested for 1'000 hours of a cut piece of color conversion film as prepared above in a climate chamber with 60° C. and 90% relative humidity. Then the so-called edge ingress was measured for the green and red emitting polymer layer (edge ingress means dead edge as resulting from degraded perovskite crystals and/or coreshell quantum dots by oxygen and/or humidity diffusion starting from the film edge towards the film centre.

Edge ingress result alter 1'000 h under 60° C./90% r.H:
Green edge ingress: 0.7 mm
Red edge ingress: 0.5 mm These results show that a color conversion film could be obtained whereby the green emitting polymer layer and red emitting polymer layer both show a good resistance to edge ingress under high-temperature/high-humidity. The green and red emission wavelength after high-temperature/high-humidity testing stayed constant.

Comparative example for example 1: Preparation of a color conversion film without an inorganic barrier layer (inorganic separating layer) between the green emitting polymer layer and the red emitting polymer layer.

The procedure was the same as in the previous procedure in example 1, except the following steps were adapted:
  The green emitting polymer layer was laminated only with one barrier film. The second film for lamination was a PET film.
  After UV curing of the green layer the PET film was removed from the sandwich structure.

Then the red emitting polymer layer was formed directly on the green emitting polymer layer and subsequently laminated with a barrier film before UV curing of the red layer as in example 1.

The green and red emission wavelength and FWHM were the same as in experiment 1.

The stability of the film was tested for 1'000 hours of a cut piece of quantum dot color conversion film as prepared above in a climate chamber with 60° C. and 90% relative humidity. Then the edge ingress was measured for the green and red emitting polymer layer.

Edge ingress result alter 1'000h under 60° C./90% r.H:
Green edge ingress: 0.7 mm
Red edge ingress: 2.0 mm These results show that a color conversion film without a inorganic separating layer between the green emitting polymer layer and red emitting polymer layer results in a large edge ingress in the red emitting polymer layer.

The invention claimed is:

1. A laminated structure comprising a multitude of layers, whereby, upon excitation by blue light, emits green and red light; the structure comprising a multitude of laminated layers whereby,
    one layer is a green photoluminescent light emitting polymer layer comprising green emitting perovskite crystals; and
    one layer is a red photoluminescent light emitting polymer layer comprising red emitting core-shell quantum dots comprising Indium and/or Cadmium; and
    whereby the red light emitting polymer layer and the green light emitting polymer layer is separated by one or more separating layers;
    wherein the green light emitting polymer layer and the red light emitting polymer layer cover the whole area of the color conversion film;
characterized in that at least one of said separating layers
    consists of inorganic material; and
    is a continuous layer and has a thickness of 1 nm to 10 micrometers; and
    covers the whole area of the laminated structure;
    wherein one or more non-emissive polymer layers are located between the red light emitting layer and the separating layer; and/or
    wherein one or more non-emissive polymer layers are located between the green light emitting layer and the separating layer.

2. The laminated structure of claim 1 wherein the separating layer has
    a water vapor transmission rate (WVTR) of less than 10 g/m$^2$*day (determined by ISO 15106-3:2003 at a temperature/relative humidity of 40° C./90% r.h.); and/or
    an oxygen transmission rate (OTR) of less than 10 cm$^3$/m$^2$*day*bar (determined by ISO15105 at a temperature of 23° C./90% r.h. and atmospheric pressure).

3. The laminated structure of claim 1 whereby one or more additional inorganic protection layers are present, said inorganic protection layers being located outside said light emitting polymer layers.

4. The laminated structure of claim 3, wherein said inorganic material of said one or more inorganic separating layer and one or more additional protection layers is independently selected from materials from the group consisting of metal oxides, metal nitrides, silicon oxides and silicon nitrides.

5. The laminated structure of claim 4, wherein said inorganic material of said one or more inorganic separating layer and one or more additional protection layers is independently selected from SiO$_x$ (x=1.7–2.3), AlO$_x$ (x=1.3–1.7), and Si$_x$N$_y$ (x=3 and y=3.5–4.5).

6. The laminated structure of claim 1 whereby the polymer of the green light emitting polymer layer and/or of the red light emitting polymer layer independently comprises acrylates or methacrylates.

7. The laminated structure of claim 1 whereby the perovskites are selected from Formamidinium lead bromide (FAPbBr$_3$); and/or the core-shell quantum dots are selected from core-shell quantum dots comprising Indium.

8. The laminated structure of claim 1
    having a total film thickness of 10-500 micrometers..

9. The laminated structure according to claim 1 further comprising
    one or more first protection layers are located adjacent to the red light emitting polymer layer opposite to the separating layer; and
    one or more second protection layers are located adjacent to the green light emitting polymer layer opposite to the separating layer,
    whereby each protection layers independently
    consists of inorganic material; and
    is a continuous layer and has a thickness of 1 nm to 10 micrometers; and
    covers the whole area of the color conversion film; and
    whereby optionally one or more non-emissive polymer layers are located between the red light emitting layer and the protection layer and/or one or more non-emissive polymer layers are located between the green light emitting layer and the protection layer.

10. The laminated structure of claim 1 comprising a multitude of layers including:
    one first inorganic protection layer, one second inorganic protection layer and one inorganic separating layer; or
    one first inorganic protection layer, one second inorganic protection layer and two inorganic separating layers.

11. The laminated structure of claim 1 comprising one or more non-emissive polymer layers, such non-emissive polymer layer(s) arranged between an inorganic protection/separation layer and a light-emitting layer.

12. The laminated structure of claim 1 comprising a multitude of laminated layers with the layer sequence comprising:
    a. a top inorganic protection layer/green light emitting polymer layer/a middle inorganic separating layer/red light emitting polymer layer/a bottom inorganic protection layer; or
    b. a top inorganic protection layer/one or more non-emitting polymer layers/green light emitting polymer layer/one or more non-emitting polymer layers/a middle inorganic separating layer/red light emitting polymer layer/a bottom inorganic protection layer; or
    C. a top inorganic protection layer/one or more non-emitting polymer layers/green light emitting polymer layer/one or more non-emitting polymer layers/a middle inorganic separating layer/non-emitting polymer layer/red light emitting polymer layer/non-emitting polymer layer/a bottom inorganic protection layer;
    wherein the middle inorganic separating layer is disposed below the green light emitting polymer layer and above the red light emitting polymer layer.

13. The laminated structure of claim 1
    whereby the polymer of the green light emitting polymer layer is less polar than the polymer of the red light emitting polymer layer,
    whereby the ratio of polarity is indicated by $z_{green}$: $z_{red}$<1:2; and whereby z is determined by molar ratio of the sum of (oxygen, nitrogen, sulfur and phosphorus) to carbon.

14. A display backlight component comprising a laminated structure of claim 1.

15. A light emitting device, preferably a Liquid Crystal Display, comprising a laminated structure of claim 1.

16. The laminated structure of claim 1, wherein the non-emissive polymer layer is a PET layer.

17. The laminated structure of claim 1, wherein the green light emitting layer has an edge ingress of 0.7 mm or less after 1000 hours at 60° C. and 90% relative humidity.

18. The laminated structure of claim 1, wherein the red light emitting layer has an edge ingress of 0.5 mm or less after 1000 hours at 60° C. and 90% relative humidity.

19. The laminated structure of claim 1, wherein the green light emitting layer retains a constant green wavelength after 1000 hours of use at 60° C. and 90% relative humidity.

20. The laminated structure of claim 1, wherein the red light emitting layer retains a constant red wavelength after 1000 hours of use at 60° C. and 90% relative humidity.

* * * * *